US006002863A

United States Patent [19]

Sheer et al.

[11] Patent Number: 6,002,863

[45] Date of Patent: Dec. 14, 1999

[54] COMPUTER IMPLEMENTED METHOD AND SYSTEM FOR SIMULATING STRATEGIC PLANNING AND OPERATIONS USING OPERATIONS CONTROL LANGUAGE

[75] Inventors: Daniel P. Sheer, Columbia, Md.; Anthony Paul Pulokas, Sacramento, Calif.; Dean James Randall, Columbia, Md.

[73] Assignee: Water Resources Management, Inc., Raleigh, N.C.

[21] Appl. No.: 09/047,116

[22] Filed: Mar. 24, 1998

[51] Int. Cl.[6] ...... G06F 9/455

[52] U.S. Cl. ...... 395/500.43

[58] Field of Search ...... 273/278; 705/7, 705/8; 395/500.43, 500.34, 500.38, 500.42, 701

[56] References Cited

U.S. PATENT DOCUMENTS

| | | | |
|---|---|---|---|
| 5,056,792 | 10/1991 | Helweg-Larsen et al. | 273/278 |
| 5,265,006 | 11/1993 | Asthana et al. | 705/8 |
| 5,930,762 | 7/1999 | Masch | 705/7 |

OTHER PUBLICATIONS

MacNair et al., Opportunities and Challenges in Manufacturing Simulation for Busy Plant Engineers, Nov. 1989, pp. 859–864.

Koch et al., Policy Definition Language for Automated Management of Distributed Systems, Mar. 1996, pp. 55–64.

Ge et al., Reverse Software Engineering of Concurrent Programs, Sep. 1990, pp. 731–742.

*Primary Examiner*—Kevin J. Teska
*Assistant Examiner*—Dan Fiul
*Attorney, Agent, or Firm*—Olive & Olive, P.A.

[57] ABSTRACT

A computer implemented method and system for simulating strategic planning and operations uses an operations control language (OCL) which has the characteristics of: (a) a target expression, (b) a condition expression, (c) an integer hierarchical priority level, (d) at least one penalty expression, and (e) a value expression. The OCL is a high level programming language for describing operating policies for simulation models, such as those used in water resources management. The OCL of the invention is written into a simple text file. The OCL has syntax, keywords and Boolean and arithmetic operators.

8 Claims, 2 Drawing Sheets

COMPUTER IMPLEMENTED METHOD AND SYSTEM FOR SIMULATING STRATEGIC PLANNING AND OPERATIONS USING OPERATIONS CONTROL LANGUAGE

BACKGROUND OF THE INVENTION

1. Field of the Invention

This invention relates to a computer-implemented method and system for simulating strategic planning and operations. The method and system use a novel operations control language (OCL) for strategic planning and operations activity simulation. More particularly the OCL is a high-level programming language that is written in a simple text file. The OCL determines operational decisions of the system by emulating the behavior of a typical simulation user. The OCL also uses target blocks to develop and modify computer simulations within a computer based simulation system. Water resource planning and management is used throughout the description as a representative example of how the invention is applied.

2. Background of the Prior Art

Computer simulations are powerful work tools. It is commonly known that in a computer simulation, groups of objects having predefined properties or characteristics typically interact according to corresponding object behavior rules that have been programmed by the creators of the simulation. Interaction between objects generates one or more corresponding predefined results or consequences according to the hard-programmed behavior rules. A user can selectively place objects in a simulation and observe their resulting interactions on a display. The results generated by a given interaction can initiate further interactions between objects, resulting in a chain of events. Computer simulations thus allow complex situations to be created and modeled.

However, when developing the prior art simulation models for strategic planning and operations activities, a commonly known first problem is finding an effective method to describe the existing operating policies or objectives of the subject matter being simulated to the simulation system in order to know what is to be accomplished by the simulation. A second problem is to find and evaluate more effective alternatives to achieve the operating objectives. The first problem typically arises because of the difference between the way the operators describe operating policies, rules, guidelines, and objectives, and the way that these policies, rules, etc. are generally input to simulation models. Generally, the differences are more than semantic. In many cases, the operator's, policies, and rules, etc. cannot be put into the form required by the models. This is often so because operators use "adaptive" operating policies, i.e., their operating objectives depend on the current state of the system. In other cases, the difficulties arise because the actual operations are goal seeking in nature, and in ways that most simulation models cannot emulate. When operators cannot fully achieve all of their operating targets, they attempt to balance the deviations. For example, as applied to water resource management, an operator may try to balance the need to maintain the water quality and the need to maintain a storage reserve. This is often done because it seems to be the "right thing" to do, rather than because it is dictated by specific operating policies and rules.

Another typical problem with the prior art computer simulations is that they are inflexible in that they do not allow the predefined object characteristics and behavior rules to be easily modified, thereby limiting its capabilities as an analytical tool. Computer simulation designers have realized that simulations are much more useful and versatile if the user is allowed to modify object properties and behavior rules. Modifications of object properties and behavior rules to any significant degree, however, involves computer programming, which often requires changing the source code of the computer simulation. Generally, a programmer writes a series of IF THEN statements to develop or modify the program for the simulation, which can take a considerable amount of time. In addition, the typical computer simulation user does not posses the specialized skills and knowledge required for compute programming. Furthermore, over time, the continual modifications to a program make it difficult to maintain, and increasingly difficult to modify.

Another problem is changing the forms of the allowed operating policies for a computer simulation. Generally, changes in these policies must be entered through the reprogramming portions of the model. The code rapidly becomes so complex and convoluted that only expert programmers with extensive experience with the particular model are competent to make the desired changes. For example, as applied to water resource planning, when there is controversy over water in a complex system, the programmers tend to become heavily overworked due to the large effort involved in making modifications. The difficulties involved in modifying models can pose severe limits on the number of alternatives evaluated for planning and operational studies.

The shortcomings of the prior art method and systems can be summarized by their lack of the ability to: 1) create new forms of operations, and 2) build in logic to control operations using input from other models running interactively and 3) add and use new input parameters efficiently.

Therefore it is an object of this invention to provide a computer implemented method and system for simulating strategic planning and operations based on the use of a novel operations control language (OCL) that can determine operating goals and objectives of a computer simulation for a simulation user.

It is another object of this invention to provide in such system a method and system an OCL that emulates the goal-seeking behavior of operators.

It is another object of this invention to provide in such method and system a high level language that can be adapted to use with existing computer simulation systems.

It is another object of this invention to provide in such method and system an OCL that allows the user to enter a wide range of forms for the operating rules, policies and their parameters through input data.

It is an object of this invention to provide for the method and system of the invention a computer program that determines operating targets of a simulation system.

It is another object of this invention to provide for the method and system of the invention a program that use target blocks to minimize the need to use IF THEN statements in a computer simulation program.

It is a further object of this invention to provide for such method and system an OCL language that uses target blocks for programming and for ease in programming, reprogramming, updating and maintaining a model in a simulation system.

SUMMARY OF THE INVENTION

The computer implemented method and system of the invention for simulating strategic planning and operations is based on the use of a novel high level operations control language (OCL) to which the summary is first described. The OCL of the invention that is utilized by the method and system of the invention is an extremely powerful, high level programming language for describing operating policies for simulation models such as those used in water resource systems analysis. The OCL is a simple text file that can be added to existing systems. The OCL has syntax, keywords and Boolean and arithmetic operators. The OCL structure is based on the way in which operators actually think about their functions. The OCL also allows a modeler to employ both rule based and goal seeking intelligence to guide operations, much as an actual operator applies them. The OCL provides a way to enter a wide range of forms for the operating rules, policies and their parameters through input data. More specifically, it allows the specification of adaptive rules and policies. In addition, it allows conditional operating rules, (where the factors that determine the conditions can be state variables), data input from time series or other databases, or parameters taken from other simulation models running in parallel. Taken together, these features represent a significant advance over the capabilities of existing computer implemented methods and systems for simulating strategic planning and operations simulation programs and systems.

DETAILED DESCRIPTION OF THE INVENTION

Figure 1:
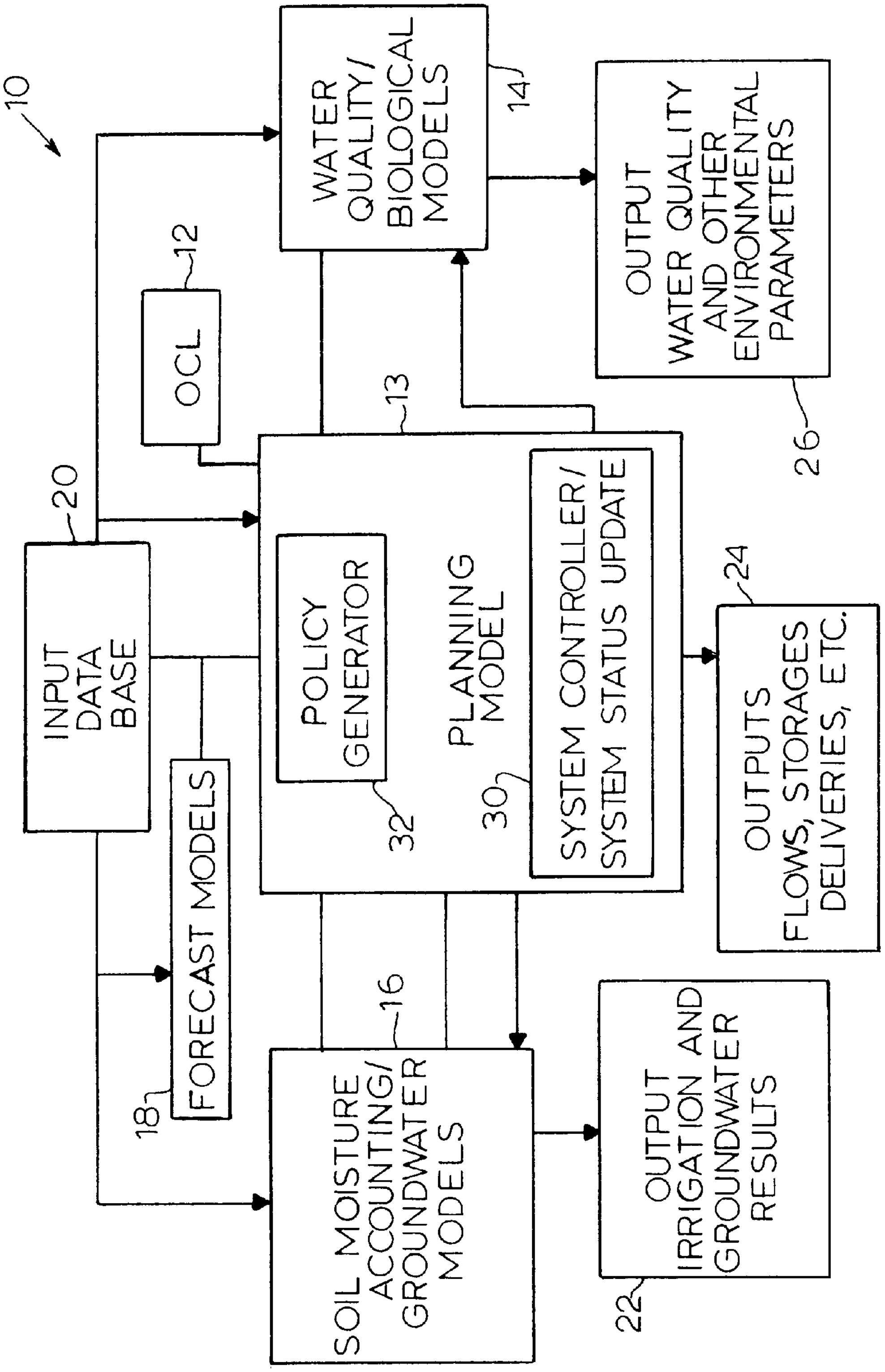
FIG. 1 shows a typical water resource management simulation system using the high-level operations control language (OCL) and having multiple models running in parallel.

FIG. 1 shows the overall framework of a typical water resource management simulation system 10 using the operations control language (OCL) 12. The OCL 12 is downloaded and read by the planning model 13. The computer simulation system may have many types of models running simultaneously. For example, a model may be: water quality/biological 14, soil moisture accounting/ground water 16, forecast model 18. There may also be economics based demand, water supply forecast, stochastic optimization and others (not shown). An input database 20 is commonly referred to as a common database. The common database feeds data to the models 14, 16 and 18 in the system. Each model may have an output means to show the results of the simulation for that particular model 22, 24 and 26. The outputs 22, 24 and 26 may be graphical plots or text tables and etc. Multiple models "run in parallel", and feed data back and forth during each time step in the simulation. This framework is flexible and allows for models or new items to be added, upgraded, or replaced without making excessive changes. In addition, individual entities may maintain individual modules without affecting the system.

Maintaining the common database (20) for such models is very important. Since all the models share a common database, all models use the same data; thus inconsistent data is less of a problem. For example, it is crucial that the rainfall data (which drives the hydrology in the hydrologic simulation) is the same rainfall data that drives the agricultural demand model. Maintaining this kind of consistency is one of the most overlooked factors in coordinating planning, regulatory, and operations activities in the simulation. A shared data structure—along with shared methodological assumptions among the technical tools used to carry out these activities—will help improve the overall coordination and effectiveness of strategic planning and operations activity simulation.

An integrated system controller 30 and the policy generator 32 are located within the planning model (FIG. 1). A unified "system controller" allows for the simulation of coordinated human control of all of the systems. The OCL is designed as the input format for a particular system controller. Flow control and demand management decisions are among the most important determinants of system performance subject to human control. This is the reason that the system controller is in the hydrologic model. However, those decisions are also among the most difficult to simulate, because they involve the balancing of multiple, short term objectives. Although the system controller is in a single model of the system, it also sets variables within the purview of other models in the system, (i.e., water demand, and crop planting decisions, economic demand). In addition, these operations can be in other models in the system and then communicate them back to the controller for the simulation module. Alternatively, system controllers with the OCL like languages can be in each individual module, allowing them to be run independently.

The OCL is the essential feature which links all the parts included in the overall framework. It is the OCL which allows the user to use the forecast models, access new information from the database, and link to other models running in parallel. Without the OCL, these features would be buried in the program code itself and much less accessible to the user.

The detailed description to follow of the method and system of the invention is now directed to the novel features of the OCL. The OCL of the invention has been discovered to provide an extremely powerful, high level programming language for describing operating policies for simulation models such as those used in water resources systems analysis and other simulations such as economic modeling and modeling for the social sciences. The OCL of the invention is written into a simple text file that is read once at the beginning of a model run. The OCL can be written in any language that can run with a computer that runs the type of computer simulation. The OCL of the system has syntax, keywords and Boolean and arithmetic operators. The rule base of the system is described in the OCL. The OCL decides operating goals and constraints based on the condition of the system. The OCL structure is based on the way in which operators actually think about their functions. The OCL allows a modeler to employ both rule based and goal seeking intelligence to guide operations, much as an actual operator applies them. The OCL provides a way to enter a wide range of forms for the operating rules, policies and their parameters through input data. More specifically, the OCL allows the specification of adaptive rules and policies. In addition, the OCL allows conditional operating rules, (where the factors that determine the conditions can be state variables), data input from time series or other databases, or parameters taken from other simulation models running in parallel. Taken together, these features represent a significant advance over the capabilities of existing computer implemented methods and systems for simulating strategic planning and operations.

The basic unit of the OCL is a Target Block, which focuses on a single operating target. The Target is an algebraic function composed of decision variables. Decision variables represent things which can be influenced by operational decisions (e.g. flows, demands, storages, etc.). The desired value of the target (called the RHS or right hand side) along with the associated penalties and priorities, are determined by the state of the system at the start of the current period or in previous periods.

Logical (Boolean) expressions are used to specify the conditions under which a target applies. These usually have a physical meaning, such as: particular months of the year, when storage exceeds 50% of capacity, when inflows are above normal, when fish begin to spawn, or when it hasn't rained in three weeks. Conditions are Boolean expressions made up of algebraic combinations of parameters describing the current or previous state of the system. The parameters may include inflows, beginning of period storages, storage or flow trends over the last six months, current inflow forecasts, or any information which would be available to an operator at the time an operational decision is made. The parameters are developed based on the type of system being simulated. For example, in an economic model, the parameters may be related to demand and supply factors. The penalties associated with the target and its hierarchical priority depend on the same conditions that determine the target's value. Unlike targets, conditions may not contain decision variables for the current period. This corresponds to the practical consideration of an operator who must choose what objectives to meet. His decision is based solely on the information available at the time.

In each time period, the simulation determines the first condition listed for that target which currently holds (i.e. is true). That condition determines values for the target. The values include the hierarchical priority and the penalties for not meeting the target. The simulation then applies the values when determining the operations for that period. The target block syntax is:

```
Target [target name] :[target expression = algebraic expression for
the target]
Condition [condition name] : [condition expression = Boolean expression
describing the conditions for which the target priority,
penalty and rhs apply]
Priority : [integer hierarchical priority level]
Penalty+ [Penalty expression = penalty value per unit for being
above the target]
Penalty- [Penalty expression = penalty value per unit for being
below the target]
RHS: [RHS value expression = the desired value for the target]
Condition [condition name]: [condition expression]
    Priority : [integer hierarchical priority level]
    Penalty+        [Penalty expression]
    Penalty-        [Penalty expression]
    RHS :           [RHS value expression]
```

The target expression contains only decision variables, while the penalty and rhs expressions contain only non-decision variables and constants (a parametric expression). Parametric expressions are evaluated at the beginning of the simulation for each period. Condition expressions are groups of parametric expressions and Boolean operators. They evaluate to true or false. The number of conditions allowed per block varies.

Penalties are not intended to be absolute. The penalties only have meaning when they are relative to other penalties, or targets contained within the same hierarchical priority. The use of hierarchical priorities makes the task of assigning penalties somewhat easier.

Since, the OCL processes the target block and implements the RHS, priorities and penalties for the first true condition, order is very important. If there is no default condition, and if no other conditions are true, then the target will not apply. Together, the target blocks specify a rule base for determining immediate operating objectives. This is similar to an expert system. The target blocks provide the model with a rule base form of artificial intelligence.

The OCL feeds the targets, (RHS, priorities, and penalties) which are appropriate for each period of a multiobjective optimization "engine." This engine provides an optimal solution for balancing the targets in the specified manner. When the OCL is used to drive a long term simulation, the solution determines the appropriate operations for the given period. When used in operations mode, the solution becomes a real time recommendation to system operators. The optimization engine provides the OCL driven model with a different kind of artificial intelligence, (e.g. a goal seeking capability). The combination of a rule base to determine appropriate goals, and the optimization to provide goal-seeking skill is what makes the OCL so powerful.

When the OCL is used in a planning modeling framework 40 (FIG. 2), the OCL 12 instructions are processed each time period in the simulation. The OCL interpreter feeds information to the models running in parallel. It then uses information about the current status of the system being simulated, and any information that it is instructed to retrieve from external models 14, 16 and 18 running in parallel to determine which operating objectives and constraints are in effect. The OCL serves as an operating policy generator 32 and constructs and optimization problem 33 to be solved using the appropriate optimization methodology. The solution to the optimization problem dictates the simulated operations for the current period. These operations are then used to update the system state variables, and the next period of the simulation is then started.

Figure 3:
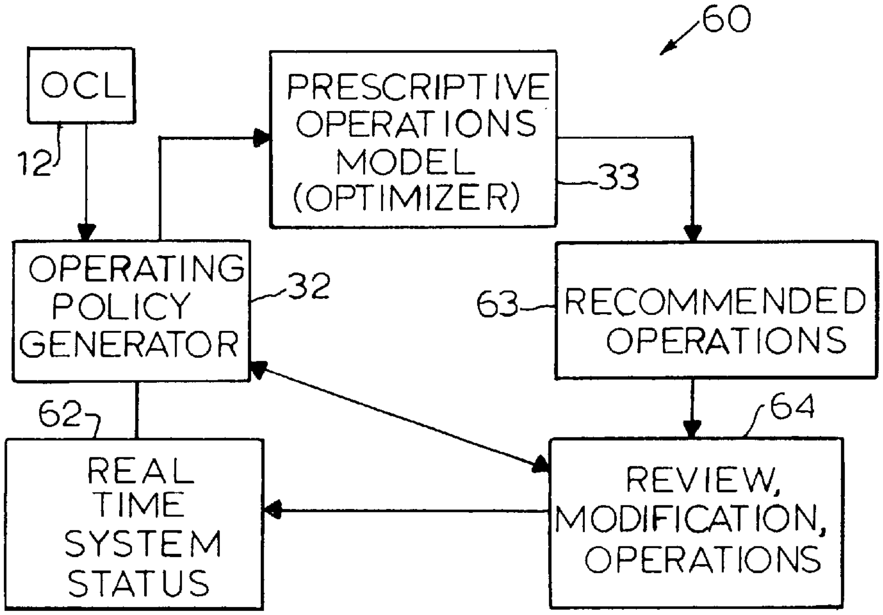
FIG. 3 shows a typical operations model structure using OCL.

OCL can also be used in an operations modeling framework 60, in a similar way (FIG. 3). In an operations application, however, the model itself does not provide the system status, this is instead provided largely by real time system 62 information from operators or from remote sensors. When the OCL instructions are processed, the results are delivered to the operators for their review. In this case the OCL serves the additional function of providing operators with an automated review of all stated operating policies, in addition to provided a recommended operations 63. The operators can them modify the operating policies, as appropriate, by making temporary or permanent modifications to the OCL file 64. When the operators are satisfied with the stated operating policies, they can implement or modify the operations recommended by the model.

Operators running a computer simulation generally must perform two functions. First, the operator must determine the most current and immediate operating objectives ("where to go"). Second, they must also determine what actions to take to best balance the competing objectives ("how to get there"). The OCL of the instant invention makes the operating target decisions for the operator. Much of the power of the OCL derives from its clear separation of these two functions. The first function, determining immediate operating objectives, is handled by creating a rule base in the OCL input. The rule base, similar to those used in expert systems, is organized by operating targets (objectives), with each section describing the specific conditions under which that target applies. Thus, the OCL explicitly provides for a very wide range of adaptive operating policies, rules and objectives. The second function, balancing objectives, is a multi-objective optimization problem that must be implemented using an option technique.

The optimization emulates the goal-seeking behavior of operators. The OCL provides for the weighting of objectives within a single objective function. It also provides a hierarchical ranking of objectives. Although hierarchical objectives can theoretically be handled by weighting, it is much easier to formulate the policies using hierarchical priorities.

Generally, a programmer writes a series of IF THEN statements to develop the program for the simulation, which can take a considerable amount of time. The basic unit of the OCL is the target block, which focuses on a single operating target. The single target block replaces the need to use a series of IF THEN statements in the program. This target block eases the difficulties of incorporating new and complex operating rules into simulation systems, and allows planners and operators to evaluate a wider range of creative alternatives. Much of the increased flexibility is due to the ability to simulate new and varied forms of operating rules, instead of a limited ability to change only the parameters of pre-defined rules. The OCL rules are also composed of constraints. The language automates the selection of the targets and constraints that are in force in any period. Once the operating targets and constraints are determined, the OCL determines how to best achieve those targets and constraints. Formulating rules in terms of goals and constraints corresponds closely to the way planners and operators think about operating rules. Generally, adding or removing a goal or constraint does not upset the rest of the rules. Such a statement does not exist in any other language and is very convenient for strategic planning and operations activity. The OCL is used with a variety of modeling systems, such as water resource planning and management, economic modeling, modeling for the social sciences and etc.

The OCL can be added to existing models, because it incorporates their data structures and variable names. Even so, defining operating policies often requires the ability to modify the values of model variables, which is based on the state of the system and the additional ability to define new variables. The OCL provides these abilities through the Set and Udef statements. The Set statement provides the ability to set existing variables through the OCL. Like targets, the set command allows the use of condition statements which dictate the value of the variable dependent on the current state of the system.

The syntax is as follows:

Set [command name]:[variable to be set]

Condition [condition name]: [condition expression]

Value: [udef value expression]

Condition [condition name]: [condition expression]

Value: [udef value expression]

The Udef command allows the user to declare new variables. These may be, parameters (which can then be used in Target Blocks), other Set and Udef statements, or actual decision variables which become a part of the optimization. Examples of decision variables are those used for piecewise linearization of objectives, in addition to variables (described below), and variables which simplify the writing of the OCL. The Udef command has two forms, one for decision variables, and the other for parameters. Since the value of decision variables is set by the optimization, condition statements are not allowed for that form. However, the user may set the bounds and type of variable. The syntax for both forms of Udef is shown below.

Non-Decision-Variable Udef-

Udef([udef number]): [udef name] [STORE I NOSTORE]

Condition [condition name]: [condition expression]

Value: [udef value expression]

Condition [condition name]: [condition expression]

Value: [udef value expression]

The STORE and NOSTORE keywords indicate that the history of the value of this variable is to be saved or not. STORED variables may be referenced as to period, as shown below.

Decision-Variable Udef:

Udef([udef number]): [udef name] [DECISION/MIMMAX]

{[lower-bound expression], [upper-bound expression], INTEGER}

When a Udef variable is declared MINIMAX the variable must be defined as greater than or equal to the variation from several targets which are intended to vary together. An OCL compiler will then set in motion a process which minimizes the maximum deviation, then minimizes the next largest deviation, and so on. We call this process a "full minimax". An example of the OCL implemented on the water resource management simulation is given below.

Existing water resources management simulation models use a mixed integer linear programming (MILP) engine called XA, which is sold by Sunset Software. These models, according to the invention are modified to work with the OCL. Water resources management simulation's run-time OCCL compiler sets up the initial MILP formulation, then modifies the formulation for each time period based on the condition statements in the target blocks. The MILP decides what to do to meet constraints and how to balance the goals.

Water resources management simulation's implementation of the OCL contains a number of features which make the language easier to use and more flexible. In particular, water resources management simulation has added database references, a small number of functions, user defined variables and parameters. Parameters include integer variables, the ability to include piecewise linearization, full minimax optimization, multiple target block definitions, and a standard structure for calling external models from the OCL.

Because the OCL rides on top of existing models, a large number of pre-existing parameters and state variables are available to the language. They are used in the algebraic expressions which are used in Target, Condition, Set, and Udef statements. We will first describe parameters and non-decision variables. Throughout the OCL input, the syntax calls for "expressions". An expression consists of known variables, constants, parentheses, mathematical operators, and functions. Every known or "state" variable has an assumed lag, which is the most current possible value of the variable. The user can override this lag by entering it in parentheses at the end of the variable. For example:

| | |
|---|---|
| demand950 | The current time-step demand at node 950 (assumed) |
| demand950(0) | The current time-step demand at node 950 |
| demand950(−1) | The demand at node 950 one time step ago |
| demand950(−2) | The demand at node 950 two time steps ago |
| demand950(+1) | The demand in the next time step. (The "+" is mandatory). |

The lag can be up to one year in either direction. In place of the lag, the user can also enter absolute time-step indexing. A dollar sign ("$") should precede period numbers (1–n), and an "M" or "m" should precede month numbers (1–12). Month indexing cannot be used when the time step of simulation is not monthly. Examples:

| | |
|---|---|
| demand950($3) | The demand at node 950 during period 3. |
| demand950(m3) | The demand at node 950 during March. |

Note that month number 3 ("m3") is always March, if on a calendar-year basis. However, period number 3 ("$3") can be any month, if on a non-calendar year system.

The nodes in a typical water resource management simulation represent specific locations in the system. Water can enter of leave the system at nodes. For example, a reservoir node is used to store water. With a demand node, water can be delivered to a reservoir. The system can also use junction nodes and others for miscellaneous functions. In addition, arcs represent conveyance features that connect one node to another.

The OCL recognizes known of "state" variables. For example, some of the variables available include:

| | |
|---|---|
| month | The calendar month number (1–12) of the end of the time step. This is assumed to be the current month. |
| year | The year number at the end of the time step. |
| day | The calendar day number (1–31) of the end of the time step. This is assumed to be the current time step. |
| abs_period | The absolute period of the simulation. This is a counter which the program starts at 1 in the initial time step and increments in every time step thereafter. It is never reset. The primary use is for identifying the initial time step (e.g. Conditions: abs_period = 1). |

The OCL recognizes decision variables. The decision variables are unknown, and thus can only be accepted in the target expression (see the Target Block syntax, above). Because the water resource simulation implementation uses a Mixed Integer Linear Programming engine, it will not accept a term which has more than one decision variable. Nor will it accept a term in which the decision variable is in the denominator. The water resource management simulation implantation recognizes the following variable names:

| | |
|---|---|
| dflow[3-digit beg node].[3-digit end node[ | The flow through the arc, in acre-feet per time step. |
| dstorage[3-digit node] | The storage at the node, in acre-feet per time step. |
| dstorA[3-digit node] | The storage between rule curves, in acre-feet per time step. |
| dstorB[3 -digit node] | The piece-wise breakdown of reservoirs is discussed in the documentation on the weights table. |
| dstorC[3 -digit node] | |
| dstorD[3-digit node] | |
| [udef name] | The current time-step value of a user-defined decision variable. |

Functions recognized by the OCL:

The arguments to functions are expressions of state variables, constants, and functions. Decision variables can never be passed as arguments to functions. The argument expressions are completely evaluated before the function is evaluated.

| | |
|---|---|
| lookup{[table name],[lookup value]} | This function looks up the value of the dependent variable (the expression, [lookup value]) in the table named [table name]. |
| min{[value 1],[value 2]} | Returns the minimum of the two expressions. |
| max{[value 1],[value 2]} | Returns the maximum of the two expressions. |
| cfs_to_af{[value in cfs]} | Converts the value of the expression from cubic feet per second to acre-feet per period. |
| af_to_cfs{[value in acre-feet]} | Converts the value of the expression from acre-feet per period to cubic feet per second. |
| call{program_name],[file_name],argument list]} | executes a system call to the program. |

When the call returns, the program the argument are updated. The parameters allowed in Set commands and udef non-decision variables may be included in the argument list. Function references are not allowed in the argument list.

Operators recognized by the OCL are:

In the order that they will be evaluated:

| | |
|---|---|
| ^ | Power |
| */ | arithmetic multiplication and division |
| +− | arithmetic addition and subtraction |
| <> <= >= = != | comparison operators: less than, greater than, less than or equals, greater than or equals, equals, and not equal and or logical operators. However, parentheses will always override the order of operations. |

Other Keywords:

static: staticdatabasename.mdb

The static keyword allows the user to define a Microsoft Access data base which contains parameters to be used as constants in the OCL. References to the data base are defined below.

time: timeseriesdatabasename.dss

The time keyword allows the user to define a Microsoft Access data base which contains parameters to be used as constants in the OCL.

Start, End

The Start keyword defines the start of the rule base for the OCL.

For,Next

The For and Next keywords allows definition of the same targets for a specified list of node numbers. The syntax is:

```
For zzz=[node_number_list]
Target: [target expression]
    {conditions}
Target: [target expression]
    {conditionls}
Next
```

The appropriate decision variables in each target expression will substitute zzz for a node number. The OCL compiler then generates the specified targets by substituting each node number in the list for zzz. For loops are particularly useful for specifying demand management policies over groups of nodes, although they have many other applications.

Default

The Default keyword is a logical expression for use in a Condition statement. It is always true.

Bound

The Bound keyword is used in Penalty statements. It sets an infinite penalty (i.e. infeasibility) for missing the target in the specified direction. Bounds hold for all priorities regardless of the priority of the target with which they are associated. Bounds are generally used to help define the value of intermediate variables, as illustrated below. Care must be exercised in the use of Bounds in order to avoid any real possibility of infeasibility in any period. Such infeasibilities automatically terminate a run.

/* . . . */

Are delimiters which define the beginning and end of comment blocks. The OCL run-time compiler ignores everything between these delimiters.

An example of a segment of the OCL used in a water resource simulation model with respect to a water reservoir is as follows:

Reservoir rule curves may be entered or modified using the OCL. The following OCL snippet sets an upper bound on storage at node 15 with a high penalty. The bound will vary, period by period, based on the pattern named rule curve entered in the data specified in the time statement at the head of the OCL file. The first condition specifies that the rule curve is reduced by 25000 af when inflows exceed 100,000 af in January through April. The default applies in all other conditions. This OCL might be used to model releases to maintain larger flood pools when a basin is still saturated right after a flood (or near flood) event. Rule curves may be entered in a wide variety of alternative forms as well.

Target: dstorge015

{Condition early_spring_flood: inflow015>=100000 AND month>=1 AND month, =4

PRIORITY:1 penalty+:1000 penalty−:0

RHS: pattern(rulecurve1)−25000

Condition normal: default

PRIORITY:1 penalty+:1000 penalty−:0

PHS: pattern(rulecurve1) }

Another example of a segment of the OCL used in a water resource simulation model with respect to ground water mining is:

The rule written in the OCL shows a rule to prevent excessive groundwater mining. The following snippet maintains a minimum groundwater storage (dstorage610) of 1.6 million acre feet (maf) under normal conditions (default). When shortages at the nodes 930, 940, 950, and 960 were over 20% (deliveries less than 80% of demand), over pumping is allowed to occur up to a total of 0.1 maf (condition shortage flag). If shortages were less than 20%, but the groundwater storage was not yet equal to the normal rule curve, then the pumping restricting is set to maintaining at last the current groundwater storage. Declines in groundwater storage can also be balanced against demands in the current period by suitable adjusting the penalty functions (not shown).

Target 1: dstgorage610

{Condition shortage_flat: /* If shortages have occurred, allow gw levels to fall to 1590000 */delivery 930 +delivery 940 +delivery 950 +delivery960 <=0.8*(demand930(−1)+demand940(−1)+demand950(−1)+demand960(−1))

PRIORITY:1 penalty+:0 penalty−:999999

RHS:1590000

Condition head_not_high_enough: storage610<1600000/*Don't cause shortages in order to refill the gw basin, but don't let the storage fall below current levels/*

PRIORITY:1 penalty+:0 penalty−:999999

RHS:storage610 condition usual_conditions: default /* normally, maintain 1600000 of gw storage */

PRIORITY:1 penalty+:0 penalty−:999999

RHS:1600000

The OCL of the invention is a simple text file that allows correct modeling of computerized simulations. No new programming is needed to modify the system. The OCL conditional rules (current conditions set rules) and goal seeking rules toe balance the system when meeting targets. The OCL lets the operator specify operating targets and how to balance them. The OCL then figures out how to best meet the operating targets in the most efficient matter. In other words, the OCL text file is the rule base for the simulation system which decides what operating goals and constraints applies to a particular situation based on the simulation system conditions. Groups of targets are prioritized to achieve first priority targets before second priority targets and so on.

New or existing programs are easily adapted to communicate with the OCL. The OCL has built in functionality for module initiation and data exchange. Languages such as Fortran, C and C++ can be used to exchange data with the OCL.

What is claimed is:

1. A computer implemented method for simulating strategic planning and operations using a language comprising:

(a) a first expression, which states an operating goal or objective;

(b) a second expression, which states the circumstances under which at least one of the following are associated with said goal or objective stated in said first expression;

i. an integer hierarchical priority level;

ii. at least one penalty expression;

iii. a value expression; and said method comprising the steps of:

using said language to establish an input that describes operating policies, rules and guidelines;

using said input to identify operating targets;

building an optimization formulation, a solution of which identifies said operations for achieving said operating targets, and;

implementing said operations according to said optimization formulation to drive a simulation or to inform operators of a recommended course of action in real time.

2. A method according to claim 1, wherein said language is an operations control language.

3. A method according to claim 1, wherein said first expression is a target expression.

4. A method according to claim 1, wherein said second expression is a condition expression.

5. A computer implemented system for simulating strategic planning and operations in a particular system using a language comprising:

(a) a first expression, which states an operating goal or objective;

(b) a second expression, which states the circumstances under which one or more of the following are associated with said goal or objective articulated in said first expression;

i. a integer hierarchical priority level;

ii. at least one penalty expression;

iii. a value expression; and said system comprising:

an input device for receiving input established by use of said language, said input comprised of operating policies, operating rules, and guidelines of said system;

a common database for storing said input;

at least one simulation model connected to said common database;

a system controller including an embedded optimization routine to control the operations of said simulation model; and an output device for displaying results of simulation, said output device having an input.

6. A computer implemented system as recited in claim 5, wherein said language is an operations control language.

7. A computer implemented system as recited in claim 5, wherein said first expression is a target expression.

8. A computer implemented system as recited in claim 5, wherein said second expression is a condition expression.

* * * * *

UNITED STATES PATENT AND TRADEMARK OFFICE
CERTIFICATE OF CORRECTION

PATENT NO. : 6,002,863

DATED : December 14, 1999

INVENTOR(S) : Daniel P. Sheer, Anthony P. Pulokas, Dean J. Randall

Figure 2:
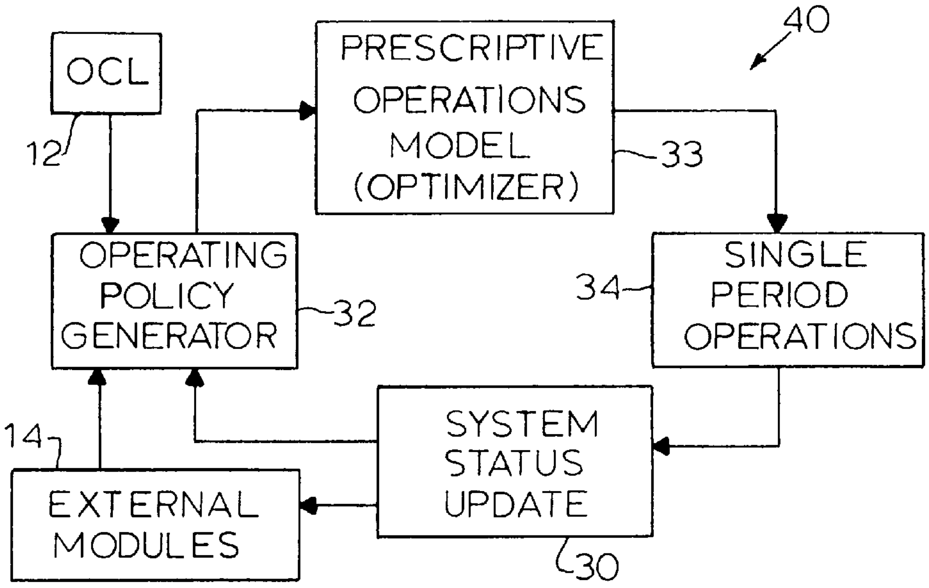
FIG. 2 shows a typical planning model structure using OCL.

It is certified that error appears in the above-identified patent and that said Letters Patent is hereby corrected as shown below:

**Figure 2, *External Modules* labelled "14" should read --15--.**
Column 2, line 32, delete "and".
Column 2, line 33, after "interactively" insert --,--.
Column 2, line 56, change "use" to --uses--.
Column 3, line 2, change "described" to --directed--.
Column 3, line 40, after "shows" insert --, by way of example,--.
Column 3, line 47, after "16," insert --or--.
Column 3, line 52, after "means" insert --22, 24 and 26--.
Column 3, line 53, delete first occurrence of "22, 24 and 26".
Column 3, line 54, after "tables" insert --,--.
Column 3, line 55, delete first occurrence of "and".
Column 3, line 55, after "run in parallel" delete ",".
Column 4, line 12, delete "a particular" and insert --the--.
Column 4, line 21, delete "and".
Column 4, line 22, before "economic" insert --and--.
Column 4, line 45, before "type" insert --same--.
Column 4, line 67, change "Target" to read --target--.
Column 6, line 26, delete "models 14, 16 and 18" and insert --modules 15--.
Column 6, line 28, delete ".".
Column 6, line 28, after "effect" insert --, wherein the term module refers to a collection of models--.

Column 6, line 29, change second appearance of "and" to --an--.
Column 6, line 32, after "period" insert --34--.
Column 6, line 35, before "OCL" insert --The--.
Column 6, line 44, delete "a" and correct "them" to read --then--.
Column 6, line 67, delete "option" and insert --optimization--.
Column 7, line 64, after "Udef-" insert --.--.

UNITED STATES PATENT AND TRADEMARK OFFICE

CERTIFICATE OF CORRECTION

PATENT NO. : 6,002,863

DATED : December 14, 1999

INVENTOR(S) : Daniel P. Sheer, Anthony P. Pulokas, Dean J. Randall

It is certified that error appears in the above-identified patent and that said Letters Patent is hereby corrected as shown below:

Column 7, line 64, after "Udef-" insert --.--.
Column 8, line 27, correct "OCCL" to read --OCL--.
Column 9, line 11, delete "of" and insert --or--.
Column 9, line 17, delete "of" and insert --or--.
Column 9, line 39, change "implantation" to read --implementation--.
Column 10, line 11, after "program" insert --and--.
Column 10, line 21, insert -- +- -- in place of "+".
Column 10, line 48, change "{conditionls}" to read --{conditions}--.
Column 11, line 51, change "suitable" to read --suitably--.
Claim 1, Column 12, line 48, after "targets" delete "," and insert --;--.
Claim 1, Column 12. line 48, after "and" delete ";".

Signed and Sealed this

Thirty-first Day of October, 2000

*Attest:*

Q. TODD DICKINSON

*Attesting Officer* *Director of Patents and Trademarks*